UNITED STATES PATENT OFFICE.

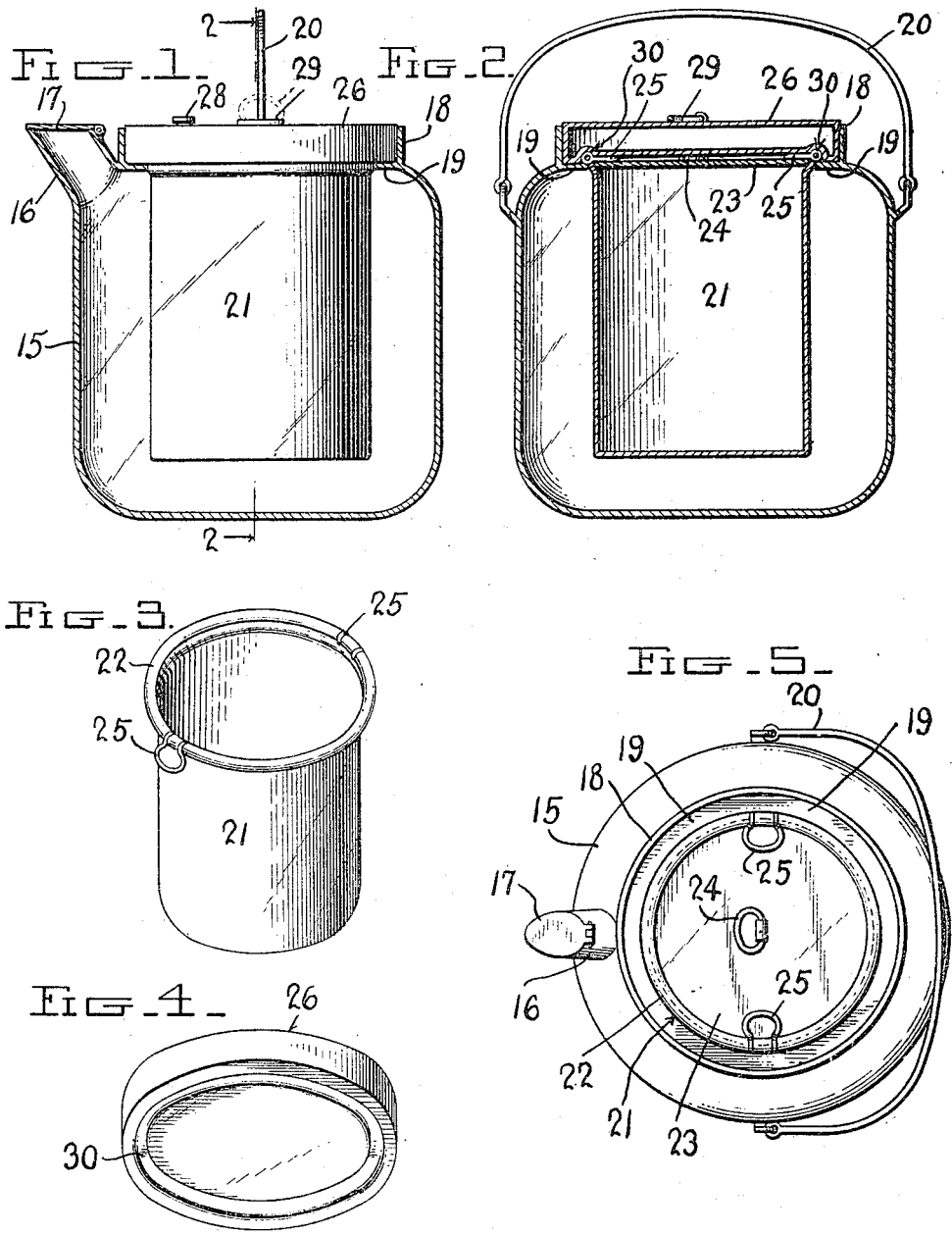

ANNA NELSON, OF COOK, MINNESOTA.

COOKING UTENSIL.

1,288,650.  Specification of Letters Patent.  Patented Dec. 24, 1918.

Application filed May 24, 1918.  Serial No. 236,354.

*To all whom it may concern:*

Be it known that I, ANNA NELSON, a citizen of the United States, residing at Cook, in the county of Saint Louis and State of Minnesota, have invented new and useful Improvements in Cooking Utensils, of which the following is a specification.

This invention relates to domestic cooking utensils and it has particular reference to a double kettle or boiler which may be usefully employed for a variety of purposes.

One object of the invention is to produce a double boiler comprising an outer and an inner vessel, the latter being supported within the outer vessel in such a manner as to be conveniently removable when desired.

A further object of the invention is to produce a simple and improved double boiler embodying an outer and an inner vessel, the inner vessel having a flat detachable lid and the outer vessel having a hollow removable lid which may be filled with hot water for the purpose of maintaining a high temperature within the inner vessel.

Further objects of the invention are to simplify and improve the general construction and arrangement of the parts constituting the improved device.

With these and other ends in view which will readily appear as the nature of the invention is better understood, the same consists in the improved construction, arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing—

Figure 1 is a side elevation partly in section of the double boiler constructed in accordance with the invention.

Fig. 2 is a section taken in the plane indicated by the line 2—2 of Fig. 1.

Fig. 3 is a perspective view of the inner vessel removed.

Fig. 4 is a perspective view of the lid of the outer vessel removed.

Fig. 5 is a plan view of the device, the lid of the outer vessel having been removed.

Corresponding parts in the several figures are denoted by like characters of reference.

15 designates a kettle or vessel, the same being constructed with a spout 16 having a hinged lid 17. The said kettle is also provided with a vertical annular rim 18 adjacent to which is formed an internal circumferential horizontally disposed flange 19, said flange being substantially at right angles to the rim 18. This kettle, which constitutes the outer vessel of the improved device, is provided with a bail 20 whereby it may be conveniently manipulated.

The inner vessel of the improved device which is shown at 21 is of substantially cylindrical shape and it is provided adjacent to its upper edge with a circumferential bead 22. The vessel 21 is made of an external diameter about equal to the internal diameter of the flange 19, enabling the said vessel 21 to be inserted within the kettle and supported by the bead 22 resting on the flange 19. The vessel 21 has a flat lid 23 which may be provided with a hinged handle 24. The said vessel 21 is also provided at diametrically opposite sides with hinged handles 25 which may be folded flatwise on the lid 23 so as to assist in retaining the latter in position, Fig. 5.

A lid is provided for the outer vessel or kettle, the same consisting of a flat cylindrical hollow casing 26 having a filling opening provided with a cap 28, said hollow lid being also provided with a handle 29. The hollow casing forming the lid 26 is made of an external diameter about equal to the internal diameter of the rim 18 within which it may be introduced so as to rest on the flange 19. The bottom of the casing 26 is preferably provided with an annular groove or channel 30 to fit over the bead 22 of the vessel 21, thus enabling the parts to be tightly and snugly assembled.

The improved device may be usefully employed for cooking or stewing meats and vegetables of all kinds by utilizing the same in the manner of an ordinary double boiler. It may also be usefully employed as a fireless cooker by placing the device in a box or receptacle partly filled with hay or other material which is non-conductive of heat. When thus employed the hot water contained in the outer vessel and in the lid or casing 26 may be renewed when desired and additional hot water may be supplied to the outer vessel through the spout 16. The parts of the device are preferably constructed of aluminum although other metal may be employed. The device is simple in construction and thoroughly useful for the purposes for which it is intended.

What is claimed, is:—

1. A device of the class described, comprising an outer vessel having at its top an opening, a vertically disposed rim surrounding said opening and a horizontal internal flange at the base of said rim, a bail connected in hinged manner to the outer vessel, an inner vessel having a bead supported on said flange and also having diametrically opposite hinged handles, a flat lid removably arranged in the upper end of the inner vessel and disposed below the bead thereof and having a hinged handle, and a lid consisting of a hollow casing having a filling opening and closure means for said opening; the said hollow lid being supported on the flange of the outer vessel and within the rim of the same and below the bail when the latter is raised, and said hollow lid having a groove in its bottom to fit over the bead of the inner vessel and the hinged handles on said bead.

2. A device of the class described comprising an outer vessel having an opening in its top and a vertically disposed rim surrounding said opening and also having a horizontal internal flange at the base of said rim, an inner vessel depending in the outer vessel and having an upper portion disposed on and supported by said flange, and a hollow lid, of disk form, arranged in the rim and supported by the flange of the outer vessel and having a filling opening, whereby said hollow lid may be charged with water.

In testimony whereof I affix my signature.

Mrs. ANNA NELSON.

Copies of this patent may be obtained for five cents each, by addressing the "Commissioner of Patents, Washington, D. C."